United States Patent
Endrikhovski et al.

(10) Patent No.: US 7,396,129 B2
(45) Date of Patent: Jul. 8, 2008

(54) DIAGNOSTIC SYSTEM HAVING GAZE TRACKING

(75) Inventors: Serguei Endrikhovski, Rochester, NY (US); Richard A. Simon, Rochester, NY (US); Elena A. Fedorovskaya, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 290 days.

(21) Appl. No.: 10/994,761

(22) Filed: Nov. 22, 2004

(65) Prior Publication Data

US 2006/0112334 A1    May 25, 2006

(51) Int. Cl.
*A61B 3/14*    (2006.01)
(52) U.S. Cl. ...................... 351/209; 345/619
(58) Field of Classification Search ............... 351/209, 351/210; 345/619, 660; 715/700
See application file for complete search history.

(56) References Cited

U.S. PATENT DOCUMENTS

| | | | |
|---|---|---|---|
| 5,731,805 A * | 3/1998 | Tognazzini et al. | 345/156 |
| 6,152,563 A | 11/2000 | Hutchinson et al. | |
| 6,243,095 B1 | 6/2001 | Shile et al. | |
| 6,917,715 B2 * | 7/2005 | Berstis | 382/239 |
| 6,956,576 B1 * | 10/2005 | Deering et al. | 345/475 |
| 2002/0105482 A1 * | 8/2002 | Lemelson et al. | 345/7 |
| 2004/0183749 A1 | 9/2004 | Vertegaal | |
| 2004/0212712 A1 | 10/2004 | Stavely et al. | |
| 2006/0033762 A1 * | 2/2006 | Card et al. | 345/660 |

FOREIGN PATENT DOCUMENTS

EP    1335270    10/1999

OTHER PUBLICATIONS

J.B. Antoine Maintz et al., "A Survey of Medical Image Registration", Oxford University Press, pp. 1-37, 1998, vol. 2, No. 1.
Stephen M. Pizer et al., "Adaptive Histogram Equalization and Its Variations", Comuter Vision, Graphics, and Image Processing 39, pp. 355-368, 1987.
Yinpeng Jin et al., "Contrast Enhancement by Multi-scale Adaptive Histogram Equalization", Proceedings of SPIE, San Diego, CA, 4478, pp. 206-213, Jul. 2001.
Dario D. Salvucci et al., "Identifying Fixations and Saccades in Eye-Tracking Protocols", Proceedings of the Eye Tracking Research and Applications Symposium (pp. 71-78), New York (ACM Press).

* cited by examiner

*Primary Examiner*—Jordan M Schwartz

(57) ABSTRACT

A method of modifying a portion of a digital image. In one arrangement, a digital image is displayed on a display, and the gaze data of a user viewing the image on the display is determined. The portion of the image being viewed by the user corresponding to the determined gaze data to identify a gaze region is then determined. The identified gaze region is modified to generate a modified gaze region, and the resulting modified gaze region is displayed on the display.

5 Claims, 5 Drawing Sheets

DIAGNOSTIC SYSTEM HAVING GAZE TRACKING

FIELD OF THE INVENTION

The present invention relates to imaging systems and, more particularly, to imaging systems enabling interactions with digital images based on gaze data, that is, information related to the movement/tracking of a human eye.

BACKGROUND OF THE INVENTION

Systems enabling interactions with digital images based on gaze data are known. For example, European Patent Application No. EP1335270 describes a method and system for using non-manual commands, such as voice and gaze, to control the actions of a medical image digital display system. Patent Application No. EP1335270 describes a method for using non-manual commands, such as voice and gaze, to control the actions of a medical image digital display system. Images are provided to the medical image digital display system to be displayed and controlled by a computer system using non-manual commands that do not require the use of the limbs of the hands or feet.

U.S. patent application Ser. No. 2004/0183749 relates to a method and apparatus for improving communications between humans and devices by means of providing an attentive user interface for obtaining information about an attentive state of a user and modulating operation of a device on the basis of the obtained information. The information about the user's attentive state is obtained through eye contact of the user with the device that is sensed by the attentive user interface.

U.S. patent application Ser. No. 2004/0212712 relates to a digital imaging device which detects or tracks a user's direction of gaze. The detected direction of gaze may be used to set one or more functions in the digital imaging device, and the history of the user's direction of gaze may be stored with a captured digital image for later use by an automatic image post-processing apparatus.

U.S. Pat. No. 6,152,563 is directed to a system for eye-gaze direction detection that uses an infrared light emitting diode mounted coaxially with the optical axis and in front of the imaging lens of an infrared sensitive video camera for remotely recording images of the eye of the computer operator. When coupled with a computer screen and a graphical user interface, the system may place the cursor at the user's point of regard and then perform the various mouse clicking actions at the location on the screen where the user fixates.

U.S. Pat. No. 6,243,095 relates to a navigation and display system having a cursor on the graphical user interface, which is coupled to a mouse, where movement of the mouse controls the location of the cursor with respect to the icons. The icons are arranged such that hand movements required to control the mouse correspond to head and eye movements made by radiologists when viewing similar images on hard copy film.

While such systems may have achieved certain degrees of success in their particular applications, there exists a need for a system that enables viewing and interacting with regions of digital images, based on gaze data.

SUMMARY OF THE INVENTION

An object of the present invention is to provide a system that can be used to promote viewing of digital images for medical diagnostic purposes.

Another object of the present invention is to provide a system that can be used to promote viewing of digital images for airport security purposes.

Another object of the present invention is to provide a system that can be used to promote viewing of digital images for quality inspection purposes Another object of the present invention is to provide a system that can be used to promote interacting with digital images for entertainment purposes These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method of modifying a portion of a digital image. The method include the steps of: displaying the digital image on a display; determining gaze data of a user viewing the image displayed on the display; determining the portion of the image being viewed by the user corresponding to the determined gaze data to identify a gaze region; modifying the identified gaze region to generate a modified gaze region; and displaying the modified gaze region on the display.

According to another aspect of the invention, there is provided a method of annotating a portion of a digital image. The method includes the steps of: displaying the digital image on a display; determining gaze data of a user viewing the image displayed on the display; determining the portion of the image being viewed by the user corresponding to the determined gaze data to identify a gaze region; providing annotation data for the identified gaze region; and associating the annotation data with the identified gaze region.

According to yet another aspect of the invention, there is provided a method for comparing image portions of two images wherein method includes the steps of: displaying a first digital image on a display; determining gaze data of a user viewing the first digital image displayed on the display; determining the portion of the first digital image being viewed by the user corresponding to the determined gaze data to identify a first gaze region; accessing a second digital image; determining, in the second digital image, a second gaze region corresponding to the first gaze region; and displaying the first and second gaze regions on the display.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

DETAILED DESCRIPTION OF THE INVENTION

Figure 1:
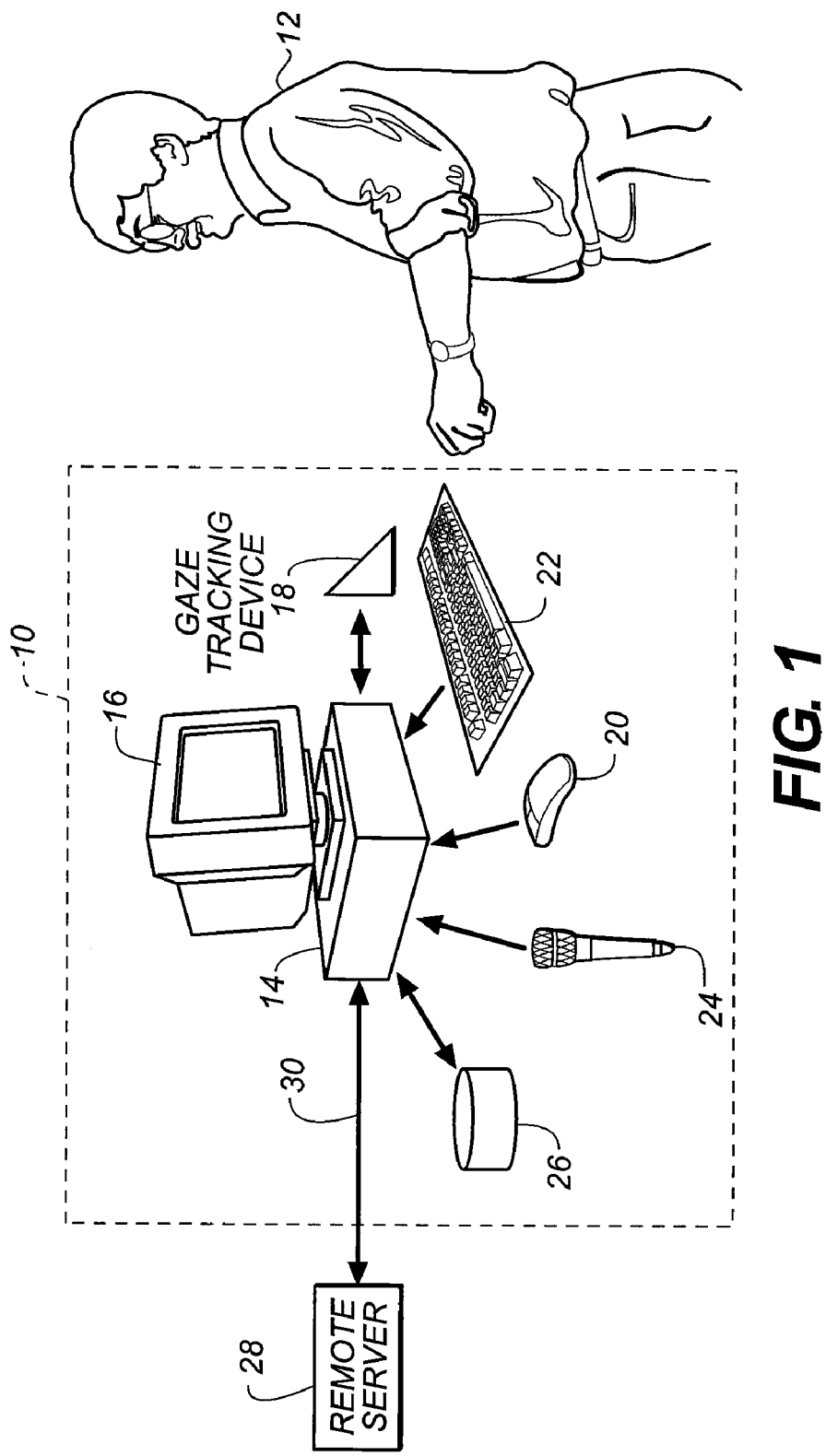
FIG. 1 is a schematic of an imaging system in accordance with the present invention.

The following is a detailed description of the preferred embodiments of the invention, reference being made to the drawings in which the same reference numerals identify the same elements of structure in each of the several figures.

FIG. 1 shows a schematic of an imaging system 10 in accordance with an embodiment of the present invention for use by a user 12. System 10 includes a computer or computer station 14 in communication with a display monitor/unit 16 viewable by user 12. Display unit 16 can utilize various known display technologies, for example, CRT, LCD, OLED, plasma, projection, and the like.

A typical user of system 10 is a radiologist or other healthcare practitioner. However, system 10 can be employed by other users needing image analysis and viewing, for example, scientists, engineers, security personal, designers, and the like.

Computer station 14 is in communication with a gaze tracking device 18, that is a device which can monitor/track/determine the movement/focus of at least one eye of user 12.

Gaze tracking device 18 can be a standalone device such as, for example, the Tobii x50 system manufactured by Tobii Company, Sweden. Alternatively, gaze tracking device 18 can be integral with display unit 16 such as, for example, Tobii 1750 system manufactured by Tobii Company, Sweden. In yet another alternative arrangement, gaze tracking device 18 can be a head-mounted device wearable by user 12 such as, for example, the ASL 501 gaze tracking system manufactured by Applied Science Laboratories, MA.

Gaze tracking device 18 is in communication with computer station 14 using means known to those skilled in the art. Such means can include a cable employing a common interface, such as the well known Universal Serial Bus (USB) interface or the IEEE 1394 interface. Alternatively, communication/connection can be established using a wireless interface, such as the well known Bluetooth interface or the IEEE Standard 802.15 interface.

System 10 further includes one or more input devices, such as a computer mouse 20, keyboard 22, or a microphone 24. Other suitable input devices can include a trackball, computer pad, joystick, touch-screen and the like.

Input devices 20,22,24 are connected to computerstation 14 by means known to those skilled in the art, for example, a cables employing a common interface, such as the well known Universal Serial Bus (USB) interface or the IEEE 1394 interface. Alternatively, the connection can be established using a wireless interface, such as the well known Bluetooth interface or the IEEE Standard 802.15 interface.

Computer station 14 includes a hard drive storage device 26 adapted to store digital data such as digital images, digitized x-rays, CT scans, MRI images, and the like. Alternatively, the digital data can be downloaded to computer station 14 from a remote server 28 using through a communication cable/network 30.

Computer station 14 is provided with appropriate application software for tracking and utilizing gaze data of user 12 in accordance with the present invention. The application software can be stored on storage device 26 or on removable media device (such as a CD-ROM disc) readable by computer station 14. Alternatively, the application software can be accessed/operated/downloaded from remote server 28.

System 10 can be employed for various applications. According to one embodiment of the present invention, system 10 is used for modifying/enhancing a local region of a digital image wherein the aforementioned local region is determined by the gaze of user 12.

An objective of modifying/enhancing a digital medical image is to improve the visibility and/or acuity of the observed phenomena to the human observer so as to increase the diagnostic performance of the user. Often, monitors/displays do not have enough dynamic range to display a digital medical image on the monitor/display without clipping/losing part of the image. Medical images can have dynamic ranges in excess of 12 bits whereas the typically display monitor has only display 8 bits of data. Therefore, a rendering function is often used to convert the medical image data into a range that is suitable to be displayed on the monitor.

One mapping function linearly scales the high dynamic range medical image such that it fits within the dynamic range of the monitor. The scaling preserves the contrast but the displayed image can suffer from a loss of visibility of detail due to quantization. In addition, the rendering functions can also be used to enhance the contrast of image structures allowing abnormalities to more readily visible to the observer. The dilemma exists as to how to display a high dynamic range medical image on a low dynamic range display while preserving and enhancing the visual detail the human observer needs in order to make an accurate diagnosis. In some cases, the observer is only interested in examining a small portion of the image at a time. Therefore, it is possible to more efficiently use the bit depth by modifying/enhancing only the local region of interest instead of trying to modify/enhance the entire image.

One method of determining the region of interest (ROI, also referred to as a local region or local gaze region) of a displayed image is to track/monitor an observer's gaze (i.e., eye movement and/or focus) and determine the observer's current fixation position. Then, the enhancement is applied only to the region of interest that is determined by the gaze of the observer. The local gaze region acts as a spatial windowing function in that only the data within the local gaze region is used to modify/enhance the image. The enhanced local image can then displayed on the monitor, and if desired, it can be displayed on the monitor superimposed on the original image.

The local gaze region is defined as a sub-region of the displayed medical image around the current gaze position of the observer. For a two dimensional medical image such as a projection radiograph, the local gaze region corresponds to a circular (or alternatively, rectangular) shaped region around the gaze point/position of the observer. For a three-dimensional image, the local gaze region corresponds to a spherical (or alternatively, rectangular box) shaped region around the gaze point/position of the observer. The extent (e.g., radius or linear dimension) of the local gaze region can be a function of one or more factors, for example: 1) the size of the original medical image; 2) the size of the screen window in which the image is displayed; 3) the size of the display/monitor and/or 4) a predetermined value defined by the user.

Figure 2:
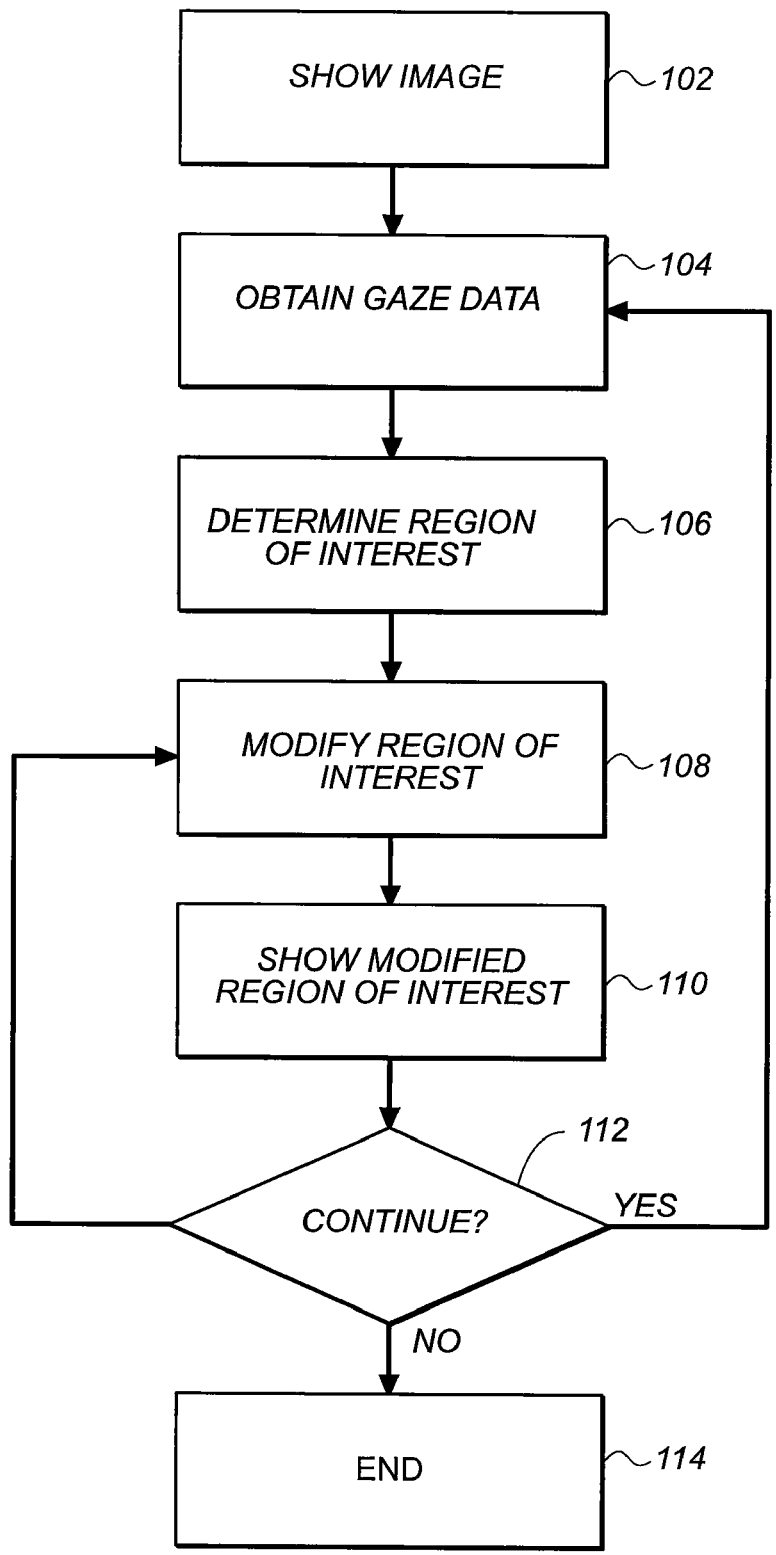
FIG. 2 is a flow diagram showing a method of local image enhancement based on gaze data in accordance with the present invention.

Referring to FIG. 2, there is shown a flow diagram illustrating one embodiment of a method in accordance with the present invention employing system 10 wherein gaze information is used to locally enhance a digital image.

Initially, a digital image is accessed and displayed on display 16, shown in FIG. 2 as acquisition and display step 102.

In a gaze data acquisition step (shown as step 104), the current location of the observers gaze is obtained from gaze tracking device 18. User 12's eye is constantly moving, saccadic motion, about an object/region of interest and is unable to fixate on a point voluntarily. The saccadic motion leads to a rapid 2-dimensional Brownian-like motion around and between fixation points. In a region of interest determination step 106, the gaze data is filtered to remove the saccadic motion so as to determine the local gaze region.

Known methods can be employed to remove the saccadic motion, for example, it can either be removed by averaging or median filtering of the last n gaze data or by using more sophisticated fixation identification algorithms such as described in D. D. Salvucci and J. H. Goldberg, "Identifying Fixations and Saccades in Eye-Tracking Protocol", *Proceedings of the Eye Tracking Research and Application Symposium*, pp. 71-88, New York, ACM Press.

In an enhancement/modification step 108, the image (i.e., the image content/data) within the local gaze region is extracted and processed through a modification/enhancement algorithm to modify/increase the visually contrast between adjacent structures. Histogram modification techniques can be employed, such as histogram equalization or contrast limited histogram equalization as described in S. M. Pizer and E. P. Auburn, "Adaptive histogram equalization and its variations", *Computer Vision, Graphics, and Image Processing*, vol. 39, pp. 355-368, 1987, to enhance the image within the local gaze region. Alternatively, multi-scale techniques that enhance the image adaptively based upon the spatial frequency properties can be used to enhance the image within the local gaze region. An example of a multi-scale enhancement technique is described in Y. Jin, L. Fayad, and A. Laine, "Contrast Enhancement by Multi-scale Adaptive Histogram Equalization," in *Wavelet Applications in Signal and Image Processing IX, Proceedings of SPIE*, San Diego Calif., 4478, pp. 206-213, July 2001.

In a show enhanced region step 110, the enhanced image (resulting from step 108) is superimposed upon the original image in the location from which it was extracted. Alternatively, the enhanced image can be enlarged and superimposed upon the original image, giving the appearance of the original image being viewed by an image enhancing magnifying glass. An optional border can be drawn around the enhanced image to help delineate the enhanced image from the original image and/or the unenhanced region of interest.

Referring now to step 112, the method of the present invention can repeat steps 104-110 so as to enhance the local gaze region until user 12 indicates (in decision step 112) that the enhancement of the local gaze region is no longer desired, wherein the process stops (step 114).

In addition to, or alternatively, the method of the present invention can repeat steps 108-110 so as to repeatedly modify/enhance the local gaze region until user 12 indicates (in decision step 112) that the enhancement of the local gaze region is no longer desired, wherein the process stops (step 114). The same local gaze region might be modified/enhanced in differing/various ways.

According to another method in accordance with the present invention, system 10 can be used for annotating a local region of an image wherein the local region of interest is determined by the gaze of the user.

The ability to annotate a local region of interest can assist the user in relating what he/she sees with what he/she says. Using this feature, for example, a radiologist can distinctly/precisely indicate an abnormality with little or no description of where the abnormality is located. A link between the abnormal region and radiologist's report can be stored automatically, and later readily retrieved for subsequent usage.

Typically, radiologist reports are shared with other doctors such as referring physicians, surgeons, specialists, and the like. By means of establishing an automatic linkage between a radiologist's dictation and the region of interest, diagnostic findings can be ready shared between medical doctors thereby reducing the chance of miscommunication and/or interpretation errors.

Figure 3:
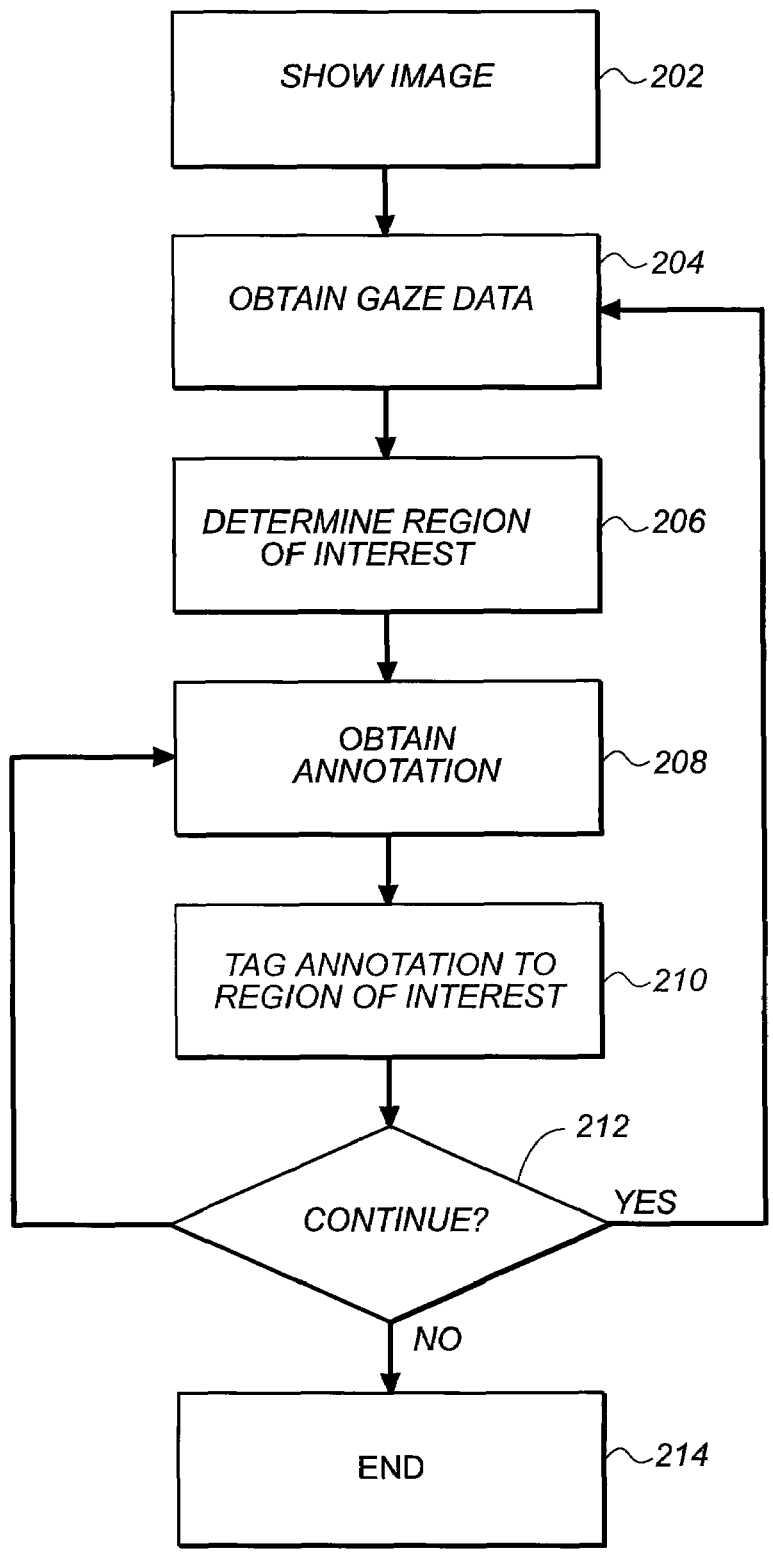
FIG. 3 is a flow diagram showing a method of local voice annotation based on gaze data in accordance with the present invention.

Referring now to FIG. 3 there is shown a flow diagram illustrating a method utilizing gaze information to locally annotate a digital image. Steps 202 through 206 mirror steps 102 through 106 of FIG. 2, and so are not further described.

In an annotation step 208, an annotation related to a region of interest is obtained using one of the input devices, such as computer mouse 20, keyboard 22, microphone 24 or other suitable input device. In one embodiment, the annotation is acquired from microphone 24 and is stored as a voice file by computer station 14. In another embodiment, the annotation is acquired from keyboard 20 or mouse 20 and stored as a text file by computer station 14.

It is recognized that the annotation can be any information—textual or visual or audible—desired to be associated with the local gaze region. For example, the annotation can be an symbol, video, notes, results of local image analysis, results of computer aided detection system, eye tracking history, eye tracking history for each of the viewers or for successive viewers.

At step 210, computer station 14 creates an annotation tag/marker indicating a name of the annotation file and corresponding region of interests determined from the gaze data. The term "metadata" is usually used to describe any information related to an image. Examples of other types of image metadata include image capture time, capture device, image capture parameters, image editing history, and the like. Alternatively, the information about the annotation file and corresponding region of interest can be stored in a separate file in association with the image identifier.

System 10 can repeat steps 204 through 210 to enable the annotation of the local gaze region until user 12 indicates, at step 212, that further annotation is no longer desired, wherein the process stops at step 214.

In addition to, or alternatively, the method of the present invention can repeat steps 208 and 210 so as to repeatedly annotate the local gaze region until user 12 indicates (in decision step 212) that sufficient annotation has been provided to the local gaze region, wherein the process stops (step 214). The same local gaze region might be annotated in differing/various ways.

System 10 can be configured to provide a visual indicator on the display or on the digital image indicating the association of the annotation data with the identified gaze region. For example, a unique symbol might be displayed such that user 12 (or subsequent viewers) can detect the existence of an annotation.

If the digital image has been previously annotated, system 10 can provide an audible indicator to user 12 when the digital image is first displayed (at steps 102 in FIG. 2 and step 202 in FIG. 3).

In addition, system 10 can provide an audible indicator indicating, at completion of the association (step 210), the successful association of annotation data with the identified gaze region.

According to another embodiment of the present invention, the system depicted in FIG. 1 can be used for comparing regions of interest in at least two images. The images can represent different projections on of the same part of the body, or they can be obtained in different time periods and/or imaging methods.

Figure 4:
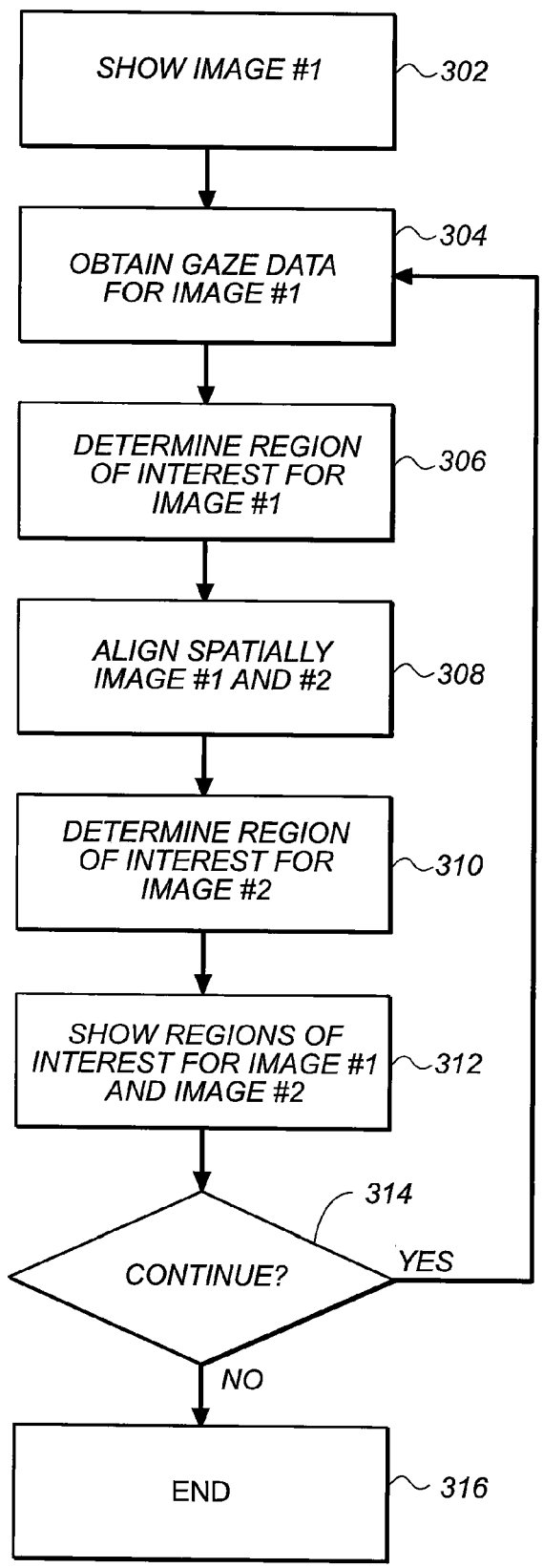
FIG. 4 is a flow diagram showing a method of local image comparison based on gaze data in accordance with the present invention.

Referring now to FIG. 4 there is shown a flow diagram illustrating a method utilizing gaze information to locally compare digital images.

Steps 302 through 306 for a first image $i_1$ mirror steps 102 through 106 of FIG. 2, and so are not further described.

In step 308, a spatial alignment of the first image $i_1$ and the second image $i_2$ is established. There is a number of ways to establish spatial alignment between digital images. In one embodiment, the images are obtained by the same device (e.g., Computer Tomography (CT) scan) and they represent two different projections (i.e., two CT slices). In this embodiment, the coordinate systems for both images match each other.

In another embodiment, the images are obtained by different devices and they represent two different modalities (e.g., a Computer Tomography (CT) slice and an Ultrasound (US) image). In this embodiment, the imaging coordinate systems need to be calibrated to each other in order have spatial alignment.

In yet another embodiment, the spatial alignment for multimodal images relies on artificial objects attached to the patient, object with are designed to be well visible and accurately detectable in all of the relevant modalities.

In yet still another embodiment, the spatial alignment relies on analyzing image content. In this embodiment, the alignment is based on a limited set of identified salient points (landmarks), on the position of segmented binary structures, most commonly object surfaces, or directly onto measures computed from the image gray values.

These methods are well known to those skilled in the art in the medical image analysis field, such methods being described in literature, for example, in J. B. A. Maintz and M. A. Viergever, "A survey of medical image registration," *Medical Image Analysis* 2(1), pp. 1-36, 1998.

In yet another embodiment, the spatial alignment for digital images is established based on gaze data obtained for reference points. In this embodiment, the user looks at a region in the first image $i_1$, then at a corresponding region in the second image $i_2$, and the mean value of daze data for the two regions are used to align the two images.

A combination of spatial alignment methods is also possible. For example, the user looks a region in the first image $i_1$, then at a corresponding region in the second image $i_2$. Consequently, image analysis is performed in both gazed regions, salient features in these regions are determined, and finally the spatial alignment is established based on the alignment of the corresponding salient features.

In step 310, the region of interest for a second image $i_2$ is defined/determined based on the spatial alignment completed in step 308.

In step 312, the regions of interest for both the first $i_1$ and second $i_2$ images are displayed for an observer's comparison. In one embodiment, the corresponding regions of interest are displayed in two separate windows side-by-side. If the region of interest for the first image is moved as a result of the gaze change, the corresponding region of interest for the second image can be automatically moved as well. Additionally, both images can be repositioned automatically inside their windows such that the corresponding regions of interests are always displayed in the center of the windows. The repositioning can be also initiated using various input devices, such as keyboard 20, computer mouse 22, and/or microphone 24.

In another embodiment, the user can toggle between two regions of interest, which are shown in the same window using either verbal or non-verbal commands.

In yet another embodiment, the corresponding regions of interest overlay each other, so that the user could see the difference between them. This can be accomplished by making one region of interest semi-transparent.

In yet another embodiment, the user can look at a difference image obtained as a result of subtraction of the region of interest of the second image from the region of interest of the first image. Additionally, other image processing and or display methods can be utilized that compare corresponding regions of interest.

Image comparison can be done with more than two images. For example, in one embodiment, the corresponding regions of interest are displayed in three separate windows for three CT slices (one large on the top of the display and two small on the bottom). If the region of interest for the first image (on the bottom) is moved as a result of the gaze change, the corresponding regions of interest for the second and third images (on the bottom) can be automatically moved as well. Additionally, all images can be repositioned automatically inside their windows such that the corresponding regions of interests are always displayed in the center of the windows.

System 10 can repeat steps 304 through 312 to enable the local comparison of images until user 12 indicates, at step 314, that further comparison is no longer desired, wherein the process stops at step 316.

According to another method in accordance with the present invention, system 10 can be used for demonstrating results of computer aided detection (CAD) method for a local region of an image wherein the local region of interest is determined by the gaze of the user.

Figure 5:
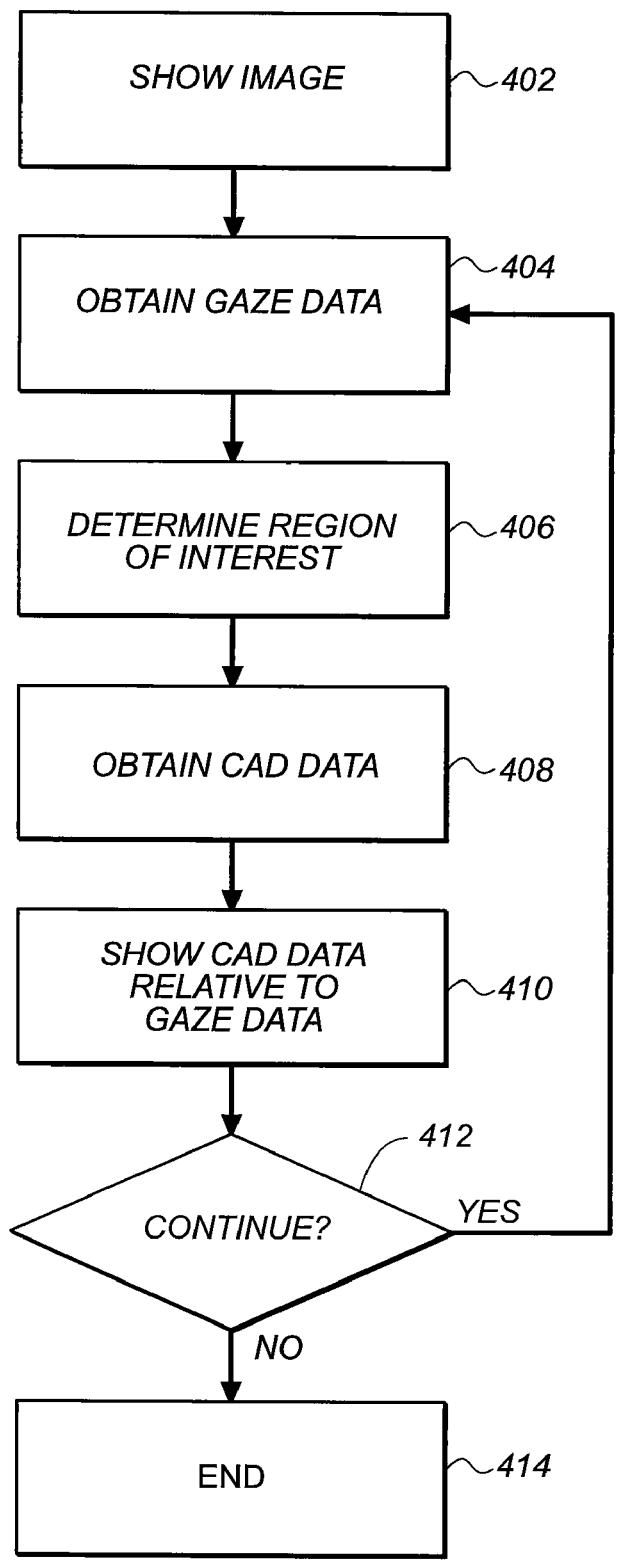
FIG. 5 is a flow diagram illustrating a method utilizing gaze information to provide local CAD data in accordance with the present invention.

Referring now to FIG. 5 there is shown a flow diagram illustrating a method utilizing gaze information to provide local CAD (computer aided detection) data. Steps 402 through 406 mirror steps 102 through 106 of FIG. 2, and so are not further described.

In step 408, results of a CAD method for the gazed region of interest are obtained. In another embodiment, results of a CAD method for the whole image are obtained. CAD methods are known. For example, Patent Application No. WO/2004029851, filed Sep. 24, 2003 by Menhardt, Zhang, and Harrington describes a CAD method for abnormalities detection in X-ray images in which the features used in the CAD analysis are displayed as coded descriptors to provide an indication to a user of a particular abnormality therefore increasing the reliability of a diagnosis established by the user.

In step 410, CAD results are shown to the user based on the gaze data. In one embodiment, the CAD data i shown for the gazed region of interest. In this embodiment, the user may want to look only for CAD data within the gazed region of interest and not be distracted by other CAD data.

In another embodiment, the CAD data for all other regions except for the gazed data are shown. This embodiment is useful if the user wants to check whether he/she miss any suspicious area with possible abnormalities, i.e., area without gaze data.

At step 412, system 10 can repeat steps 404 through 410 to enable the local view of CAD data until user 12 indicates that further inspection is no longer desired, wherein the process stops at step 416.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

We claim:

1. A method of annotating a portion of a digital image, comprising the steps of:
   (a) displaying the digital image on a display;
   (b) determining gaze data of a user viewing the image displayed on the display;
   (c) determining the portion of the image being viewed by the user corresponding to the determined gaze data to identify a gaze region;
   (d) receiving annotation data for the identified gaze region from the user;
   (e) associating the annotation data with the identified gaze region;
   (f) displaying the identified gaze region; and
   (g) displaying a visual indicator on the display or on the digital image indicating the association of the annotation data with the identified gaze region.

2. The method of claim 1, further comprising the step of providing an audible indicator indicating the association of annotation data with the identified gaze region.

3. The method of claim 1, wherein the steps of (b) through (e) are repeated.

4. The method of claim 1, wherein the steps of (d) and (e) are repeated.

5. The method of claim 1, further comprising the steps of:
   modifying the identified gaze region to generate a modified gaze region; and
   displaying the modified gaze region on the display.

* * * * *